United States Patent
Lin et al.

(10) Patent No.: US 11,757,691 B2
(45) Date of Patent: Sep. 12, 2023

(54) METHOD AND APPARATUS FOR MULTIPLE ACCESS TRANSMISSION

(71) Applicant: Telefonaktiebolaget LM Ericsson (publ), Stockholm (SE)

(72) Inventors: Zhipeng Lin, Jiangsu (CN); Ali Behravan, Stockholm (SE); Robert Mark Harrison, Grapevine, TX (US); Robert Baldemair, Solna (SE); Andres Reial, Malmö (SE); Behrooz Makki, Gothenburg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 73 days.

(21) Appl. No.: 17/056,917

(22) PCT Filed: Jun. 12, 2019

(86) PCT No.: PCT/CN2019/090940
§ 371 (c)(1),
(2) Date: Nov. 19, 2020

(87) PCT Pub. No.: WO2020/001274
PCT Pub. Date: Jan. 2, 2020

(65) Prior Publication Data
US 2021/0119757 A1 Apr. 22, 2021

(30) Foreign Application Priority Data
Jun. 29, 2018 (WO) ................ PCT/CN2018/093689

(51) Int. Cl.
*H04W 4/00* (2018.01)
*H04L 27/26* (2006.01)
(Continued)

(52) U.S. Cl.
CPC ............ *H04L 27/2626* (2013.01); *H04L 1/08* (2013.01); *H04L 5/0091* (2013.01); *H04L 27/2602* (2013.01)

(58) Field of Classification Search
CPC ....... H04L 5/0091; H04L 1/08; H04L 5/0021; H04L 27/2626; H04L 5/0012; H04L 5/0026; H04L 27/2602
(Continued)

(56) References Cited

U.S. PATENT DOCUMENTS

2017/0286410 A1* 10/2017 Xu .................... H04L 5/0021
2018/0049234 A1* 2/2018 Lee .................... H04L 1/1864
(Continued)

FOREIGN PATENT DOCUMENTS

CN        103368717 A     10/2013
CN        107371270 A     11/2017
(Continued)

OTHER PUBLICATIONS

"Procedures related consideration to NoMA", 3GPP TSG RAN WG1 Meeting #92bis, R1-1804398, Sanya, China, Apr. 16-20, 2018, pp. 1-6.
(Continued)

*Primary Examiner* — Chuong T Ho
(74) *Attorney, Agent, or Firm* — Murphy, Bilak & Homiller, PLLC

(57) ABSTRACT

The present disclosure relates to a method and an apparatus for multiple access transmission. The method includes: determining (S401) a first signature allocated to a first transmission; and determining (S402) a second signature allocated to a second transmission. With hopping of the signature, the successful rate of NOMA transmission in the communication system will be improved.

18 Claims, 12 Drawing Sheets

(51) Int. Cl.
*H04L 1/08* (2006.01)
*H04L 5/00* (2006.01)

(58) Field of Classification Search
USPC .................................................. 370/329, 330
See application file for complete search history.

(56) References Cited

U.S. PATENT DOCUMENTS

| | | | |
|---|---|---|---|
| 2018/0123765 A1* | 5/2018 | Cao | H04L 1/1861 |
| 2019/0158338 A1* | 5/2019 | Herath | H04L 27/3488 |
| 2019/0190753 A1* | 6/2019 | Bayesteh | H04J 14/007 |
| 2019/0229957 A1* | 7/2019 | Lei | H04B 7/0456 |
| 2019/0230691 A1* | 7/2019 | Cao | H04L 5/0044 |
| 2019/0342121 A1* | 11/2019 | Cheng | H04L 5/0007 |
| 2021/0067300 A1* | 3/2021 | Pan | H04B 17/309 |
| 2021/0100002 A1* | 4/2021 | Pan | H04W 72/23 |

FOREIGN PATENT DOCUMENTS

| | | |
|---|---|---|
| CN | 107872290 A | 4/2018 |
| EP | 3457739 A1 | 3/2019 |

OTHER PUBLICATIONS

"Support of HARQ in grant-free based multiple access", 3GPP TSG RAN WG1 Meeting #86, R1-1609039, Lisbon, Portugal, Oct. 10-14, 2016, pp. 1-4.

"Support of link adaptation for UL grant-free NOMA schemes", 3GPP TSG-RAN WG1 #86bis, R1-1610374, Lisbon, Portugal, Oct. 10-14, 2016, pp. 1-4.

"Discussion on multiple access for new radio interface", 3GPP TSG RAN WG1 Meeting #84bis; R1-162226; Busan, Korea, Apr. 11-15, 2016, pp. 1-12.

"Signature Design for NoMA", 3GPP TSG RAN WG1 Meeting #92Bis; R1-1805003; Sanya, China, Apr. 16-20, 2018, pp. 1-7.

* cited by examiner

METHOD AND APPARATUS FOR MULTIPLE ACCESS TRANSMISSION

TECHNICAL FIELD

The present disclosure relates generally to the technology of wireless communication, and in particular, to a method and apparatus for multiple access transmission.

BACKGROUND

This section introduces aspects that may facilitate better understanding of the disclosure. Accordingly, the statements of this section are to be read in this light and are not to be understood as admissions about what is in the prior art or what is not in the prior art.

FIG. 1 is an exemplary block diagram showing nodes in a typical communication system. As shown in FIG. 1, in a communication network, there may be a demand for node 100 to communicate with a plurality of nodes 201, 202, 203 . . . , simultaneously. For example, one network node (e.g. base station) may be arranged to communicate with a plurality of wireless devices (e.g. user equipments (UE)), or a plurality of transmission branches/layers (including independent transport blocks (TB)) of a wireless device.

In order to distinguish different signals from/to a plurality of nodes, one solution is to ensure, or at least attempting to ensure, orthogonality of the transmitted signals, as in a conventional orthogonal multiple access (OMA) manner. In such manner, transmission resources, such as time, frequency, or spatial allocation are orthogonally divided for transmitting different signals. Accordingly, to account for imperfections (not completely orthogonal) in such allocation or in the propagation channel for these signals, restoring orthogonality is the aim of a receiver procedure. Equalizers, IRC- and other MMSE-like receivers for e.g. S-OFDM or MIMO transmission, and non-linear variants of such receivers are used. IRC refers to interference rejection combining, MMSE refers to minimum mean square error, S-OFDM refers to spread-orthogonal frequency division multiplexing, and MIMO refers to multiple-input multiple-output.

However, in some scenarios, the transmission resources may be not enough to be divided. For example, in some scenarios, one base station needs to handle a larger number of UEs over given resources than that would be allowed according to the OMA approach, e.g. when the available degrees of freedom (DoF) of given resources are fewer than the number of UEs to be served.

In order to improve the number of nodes to be served in a communication system, a method for non-orthogonal multiple access (NOMA) transmission is further needed.

SUMMARY

Certain aspects of the present disclosure and their embodiments may provide a solution to at least part of these or other challenges. There are, proposed herein, various embodiments which address one or more of the issues disclosed herein.

A first aspect of the present disclosure provides a method for multiple access transmission by a transmitter. The method includes: determining a first signature allocated to a first transmission of a block of data; and determining a second signature allocated to a second transmission of a block of data.

In embodiments of the present disclosure, the first signature is selected from a first set of signatures, and the second signature is selected from a second set of signatures.

In embodiments of the present disclosure, the first signature and the second signature are selected randomly. The first set of signatures and the second set of signatures are predefined based on a transmission policy, or are configured by a transmission node.

In embodiments of the present disclosure, the transmission node is a node on network side of a communication system.

In embodiments of the present disclosure, the first set of signatures and the second set of signatures are received via layer 1 signalling or a higher layer signalling.

In embodiments of the present disclosure, the layer 1 signalling includes downlink control information signalling.

In embodiments of the present disclosure, the first set of signatures and the second set of signatures are the same.

In embodiments of the present disclosure, the second transmission is a re-transmission of the first transmission. A size of the second set of signatures is smaller than a size of the first set of signatures.

In embodiments of the present disclosure, the first transmission is an initial transmission, and the second transmission is another initial transmission. Or, the first transmission is a re-transmission of an initial transmission, and the second transmission is another re-transmission of the initial transmission.

In embodiments of the present disclosure, the method further includes: determining a first frequency resource allocated to the first transmission; and determining a second frequency resource allocated to the second transmission.

In embodiments of the present disclosure, the method further includes: determining a first redundancy version of an incremental redundancy allocated to the first transmission; and determining a second redundancy version of an incremental redundancy allocated to the second transmission.

In embodiments of the present disclosure, the at least one of the first signature and the second signature is determined based on a transmission policy, or configured by a transmission node.

In embodiments of the present disclosure, the at least one of the first signature and the second signature is determined based on a transmission parameter.

In embodiments of the present disclosure, transmission parameter includes at least one of: a frequency, a redundancy version, and a system frame number.

In embodiments of the present disclosure, a relationship between the at least one of the first signature and the second signature, and the transmission parameter is predefined based on a transmission policy, or configured by a transmission node.

In embodiments of the present disclosure, the at least one of the first signature and the second signature includes at least one of: an encoding parameter, a modulating parameter, a spreading parameter, a resource mapping parameter, a power allocation parameter, a resource mapping pattern, and an orthogonal cover code.

In embodiments of the present disclosure, the spreading parameter includes: a spreading sequence.

In embodiments of the present disclosure, the transmitter is a user equipment.

In embodiments of the present disclosure, the transmitter is a transmission branch of a user equipment.

In embodiments of the present disclosure, the transmitter is a base station.

In embodiments of the present disclosure, the at least one of the first signature and the second signature is allocated to a block of data to be transmitted during one of: an uplink transmission, a downlink transmission, and a sidelink transmission.

A second aspect of the present disclosure provides a method for multiple access transmission by a transmitter. A set of signatures is arranged for a group of transmitters including the transmitter. The method comprises: allocating a signature from the set of signatures to a transmission of a block of data, which is different from another signature allocated from the set of signatures by another transmitter in the group of transmitters, in response to that the transmitter shares a transmission resource with the another transmitter.

A third aspect of the present disclosure provides a method for multiple access transmission by a transmitter. The transmitter is configured to communicate with a group of receivers. A set of signatures is arranged for the group of receivers. The method comprises: allocating a signature from the set of signatures to a transmission of a block of data for a receiver in the group of receivers, which is different from another signature in the set of signatures allocated for another receiver in the group of receivers, in response to that the receiver shares a transmission resource with the another receiver.

A fourth aspect of the present disclosure provides an apparatus for multiple access transmission, including: a processor; and a memory containing instructions executable by the processor. The apparatus is operative to the method described above.

A fifth aspect of the present disclosure provides a computer readable storage medium having a computer program stored thereon, the computer program is executable by a device to cause the device to carry out the method described above.

A sixth aspect of the present disclosure provides a communication system including a host computer comprising: processing circuitry configured to provide user data; and a communication interface configured to forward the user data to a cellular network for transmission to a terminal device. The cellular network comprises a base station. The base station is the apparatus described above, or the terminal device is the apparatus described above.

In embodiments of the present disclosure, the communication system further includes the terminal device. The terminal device is configured to communicate with the base station.

In embodiments of the present disclosure, the processing circuitry of the host computer is configured to execute a host application, thereby providing the user data; and the terminal device comprises processing circuitry configured to execute a client application associated with the host application.

A seventh aspect of the present disclosure provides a communication system including a host computer comprising: a communication interface configured to receive user data originating from a transmission from a terminal device; and a base station. The transmission is from the terminal device to the base station. The base station is the apparatus described above, or the terminal device is the apparatus described above.

In embodiments of the present disclosure, the processing circuitry of the host computer is configured to execute a host application; the terminal device is configured to execute a client application associated with the host application, thereby providing the user data to be received by the host computer.

With hopping of the signature, (namely, usage of different signatures for different transmissions), the diversity gain for the transmission is improved. Namely, it will be easier to distinguish different signals from different transmitter. The successful rate of transmission in the communication system will be improved. More users may be served by the network.

BRIEF DESCRIPTION OF DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
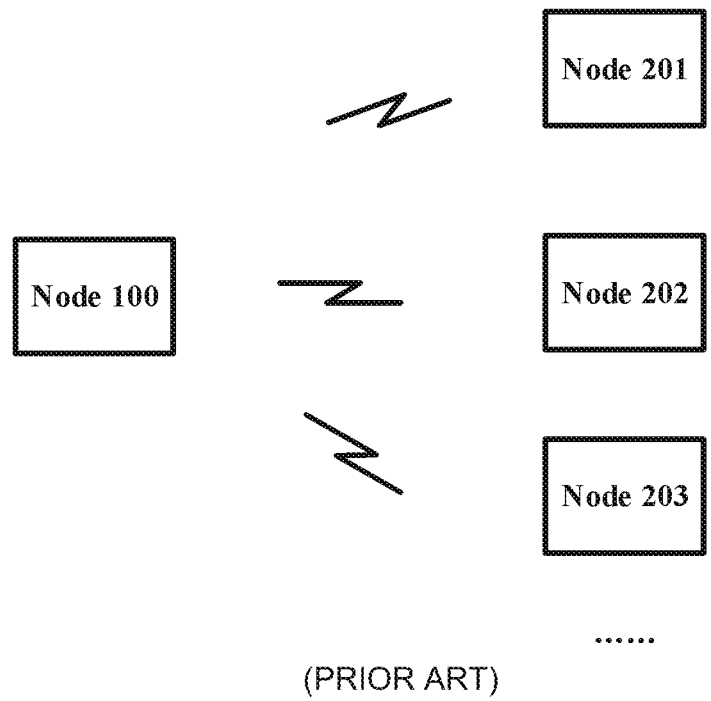
FIG. 1 is an exemplary block diagram showing nodes in a communication system.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network", or "communication network/system" refers to a network/system following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" or "network side node" refers to a network device/apparatus/entity with accessing capability in a communication network via which a terminal device accesses to the network and receives services therefrom. The node/function may include a base station (BS), an access point (AP), a multi-cell/multicast coordination entity (MCE), a server node/function (such as a service capability server/application server, SC S/AS, group communication service application server, GCS AS, application function, AF), an exposure node (such as a service capability exposure function, SCE, network exposure function, NEF), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term terminal device encompasses a device which is able to communicate with a network node, such as a base station, or with another wireless device by transmitting and/or receiving wireless signals. Thus, the term terminal device encompasses, but is not limited to: a mobile phone, a stationary or mobile wireless device for machine-to-machine communication, an integrated or embedded wireless card, an externally plugged in wireless card, a vehicle, etc.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Figure 2:
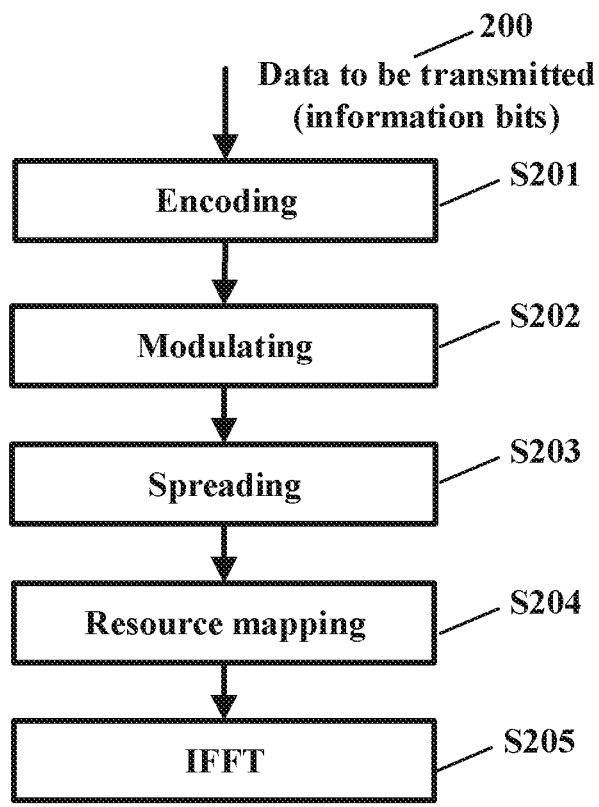
FIG. 2 is an exemplary flow chart showing a method for processing data to be transmitted wirelessly by a transmitter.

FIG. 2 is an exemplary flow chart showing a method for processing data to be transmitted wirelessly by a transmitter. As shown in FIG. 2, in step S201, an encoding process is implemented for data to be transmitted 200, which may be in a form of digital bits. In step S202, a modulating process is implemented. In step S203, a spreading process is implemented. In step S204, a resource mapping is implemented. In step 205, an inverse fast Fourier transform is implemented.

NOMA schemes are generally based on interleaving, scrambling, or spreading methods and mapping the user data on resources that are shared among multiple users. Multiple users can then be scheduled in same resources, according to a NOMA approach, with the inherent realization that the users' signals will not be substantially orthogonal at the receiver. Rather, there will exist residual inter-user interference that needs to be handled by the receiver. By the nature of NOMA transmission, multiple signals are received non-orthogonally and the overlapping signals will generally be separated by the receiver prior to decoding. To assist in that handling, UE-specific signature may be imposed on the individual UEs' signals. The receiver can then use the presence of the signatures to facilitate extracting the individual users' signals. Another equivalent view is that invoking the signatures allows the effective end-to-end channel to be made closer to diagonal.

In embodiments of the present disclosure, the transmitter is a user equipment, or a transmission branch of a user equipment. With reference to FIG. 1, the transmitter may be one of the nodes 201, 202, 203, which refers to a user equipment, or a transmission branch (layer) of a user equipment. The transmission would be an uplink transmission accordingly.

In other embodiments of the present disclosure, the transmitter is a base station. With reference to FIG. 1, the transmitter may be node 100, which refers to a base station. The transmission would be a downlink transmission accordingly.

In other embodiments of the present disclosure, the transmission may be a sidelink transmission, such as transmissions between nodes 201, 202, 203.

As shown in FIG. 2, such signature will be used in any processing step. The signature may include at least one of: an encoding parameter, a modulating parameter, a spreading parameter, a resource mapping parameter, a power allocation parameter, a resource mapping pattern, and an orthogonal cover code. Further, the spreading parameter may include a spreading sequence.

A spreading parameter will be described as an example without limitation. In NOMA, UE transmissions are overlapping on shared time and frequency resources, by using properly designed sequences/vectors in order to spread the information symbols in frequency. In a category of NOMA which is based on spreading, this preprocessing is carried out by repeating the multi-level quadrature amplitude modulation (M-QAM) information symbols over a number of contiguous resource elements (REs), yet each with different weight and phase. The idea behind the NOMA paradigm is that the clever design of spreading vectors can facilitate the implementation of advanced multi-user detectors (MUD), such as the minimum-mean squared-error (MMSE) detector or the maximum a posteriori (MAP) detector, in order to improve the joint detection/demodulation of the superimposed UE transmissions. The system can then achieve enhanced performance, in terms of sum-rate and/or number of supported UEs, when NOMA-enabled UEs are sharing the time/frequency resources and effective MUD solutions are used to separate their data signals.

Figure 3:
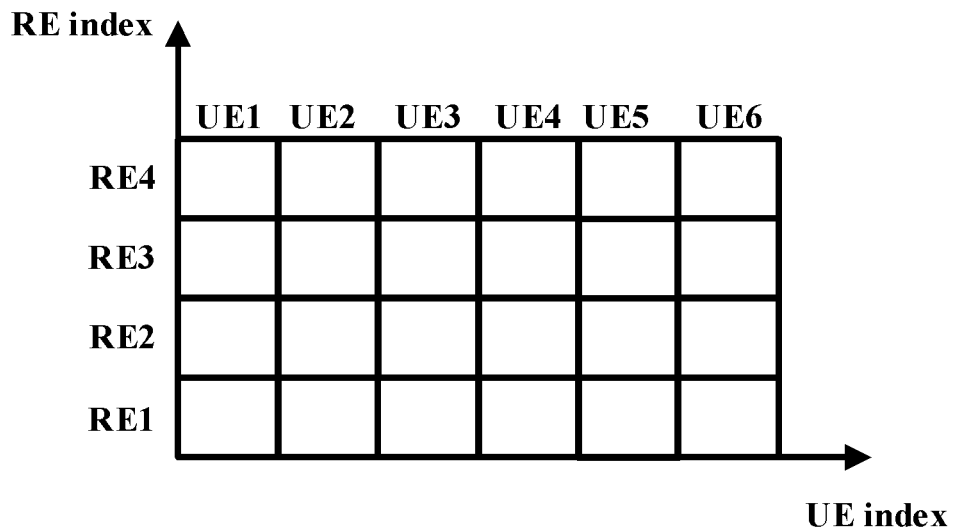
FIG. 3 is an exemplary block diagram showing a matrix structure obtained by spreading QAM symbols.

FIG. 3 is an exemplary block diagram showing a matrix structure obtained by spreading QAM symbols. As shown in FIG. 3, 4 REs are multiplexed to 6 UEs over NOMA spreading, as an example.

A generic vector representation of this multi-user system may be illustrated as: $y=\Sigma_{k=1}^{K}S_k h_k b_k +z$, wherein $S_k$ is a diagonal matrix with the elements of the vector $S_k$ on its main diagonal, and $S_k$ is the spreading sequence for the k'th user. Also, $h_k$ is the channel for the k'th user, and $b_k$ is the information symbol of the k'th user. Z refers to noise or error. K is the number of users.

The total squared cross-correlation of the spreading sequences is:
$T_c \triangleq \Sigma_{i,j} |s_i^H s_j|^2$. The spreading sequences are designed to meet the Welch-bound with equality (WBE), i.e. $T_c \geq K^2/N$, and thus $$\sum_{i,j} |s_i^H s_j|^2 = K^2/N,$$

wherein N is the length of the spreading sequence, i, j are indexes of the user.

With such design metric, applicable spreading sequence may be chose as signature for the transmission, so as to improve the usage of the same transmission resources. The number of the users in a communication system may be improved.

Figure 4:
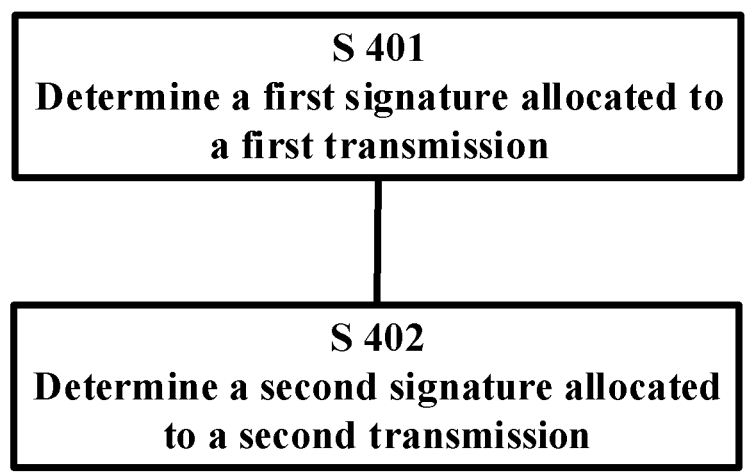
FIG. 4 is exemplary flow chart showing a method for multiple access transmission by a transmitter according to embodiments of the present disclosure.

FIG. 4 is exemplary flow chart showing a method for multiple access transmission by a transmitter according to embodiments of the present disclosure.

As shown in FIG. 4, the method includes: S401, determining a first signature allocated to a first transmission of a block of data; and S402, determining a second signature allocated to a second transmission of a block of data.

Table 1 shows a plurality of transmissions TX1, TX2, TX3, and TX4 with different signature S0, S1, S2, S3. This is, the signature may hop each time.

TABLE 1

| TX1 | TX2 | TX3 | TX4 |
|-----|-----|-----|-----|
| S0  | S1  | S2  | S3  |

With the hopping of the signature (namely, usage of different signatures for different transmissions), the diversity gain for the transmission is improved. Namely, it will be easier to distinguish different signals from different transmitter. In particular, even if two transmitter select two similar signatures at the same time such that transmissions from the two transmitter fail, it will be very hard for the signatures of re-transmissions for the two failed transmission to be similar. The successful rate of transmission in the communication system will be improved. More users may be served by the network.

Figure 5:
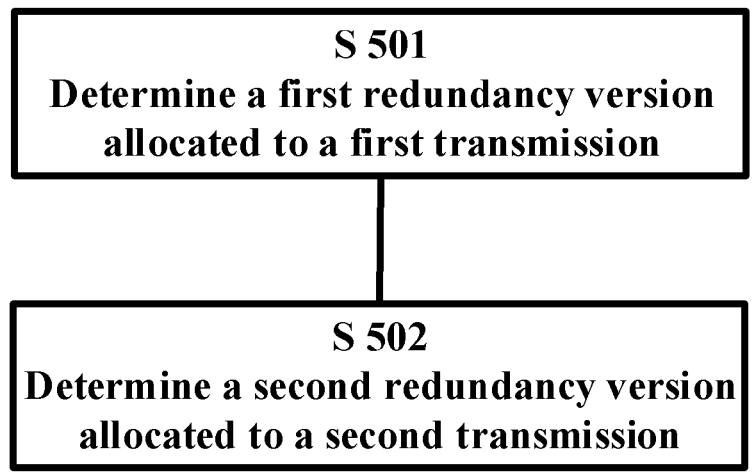
FIG. 5 is exemplary flow chart showing other exemplary steps of the method in FIG. 4.

FIG. 5 is exemplary flow chart showing other exemplary steps of the method in FIG. 4.

Without limitation, the first transmission may be an initial transmission, and the second transmission may be another initial transmission. Or, the first transmission is a re-transmission of an initial transmission, and the second transmission is another re-transmission of the initial transmission. Or, the second transmission is a re-transmission of the first transmission. The transmission, especially the re-transmission adopts redundancy version of an incremental redundancy.

As shown in FIG. 5, the method further includes: S501, determining a first redundancy version of an incremental redundancy allocated to the first transmission; and S502, determining a second redundancy version of an incremental redundancy allocated to the second transmission.

Table 2 shows that the plurality of transmissions TX1, TX2, TX3, and TX4 have different redundancy versions RV1, RV3, RV2, and RV4. As well as the hopping of the signature, the redundancy version hops. The transmissions will vary more greatly each time. Therefore, the successful rate of transmission in the communication system will be further improved.

TABLE 2

| TX1, RV1 | TX2, RV3 | TX3, RV2 | TX4, RV4 |
|---|---|---|---|
| S0 | S1 | S2 | S3 |

Figure 6:
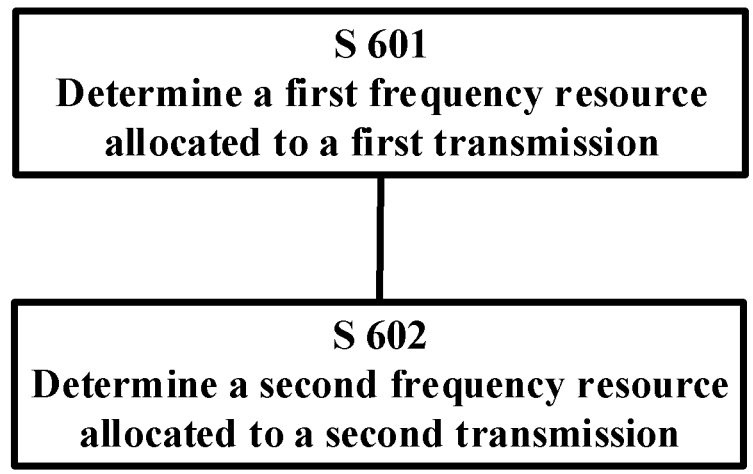
FIG. 6 is another exemplary flow chart showing other exemplary steps of the method in FIG. 4.

FIG. 6 is another exemplary flow chart showing other exemplary steps of the method in FIG. 4. As shown in FIG. 6, the method further includes: S601, determining a first frequency resource allocated to the first transmission; and S602, determining a second frequency resource allocated to the second transmission.

Table 3 shows that the plurality of transmissions TX1, TX2, TX3, and TX4 have different frequency resources f1, f2, f3. As well as the hopping of the signature, the frequency resource hops. The transmissions will vary more significant each time. Therefore, the successful rate of transmission in the communication system will be further improved.

TABLE 3

| TX1 | TX2 | TX3 | TX4 |
|---|---|---|---|
| S0, f1 | S1, f2 | S2, f3 | S3, f1 |

In embodiments of the present disclosure, the signature may be determined based on a transmission policy, or configured by a transmission node. For example, when the transmitter is a UE, a pre-stored content of the transmission policy according to a communication standard, etc., may include a predetermined signature, or a set of signatures. Alternatively, the signature may be configured by a node on network side, such as a base station, of a communication system.

Further, the signature may be determined based on a transmission parameter, to further increase the flexibility. The transmission parameter may include at least one of: a frequency, a redundancy version, and a system frame number. A relationship between the signature and the transmission parameter may be predefined based on a transmission policy, or configured by a transmission node. It should be understood, transmission parameter may also include any other parameters, without any limitation.

The signatures may be received via layer 1 signalling or a higher layer signalling. The layer 1 signalling includes downlink control information (DCI) signalling. Other signalling, such as radio resource control (RRC) signalling, may also be used.

In embodiments of the present disclosure, the signature may be selected from a set of signatures. The signature may be selected randomly. The set of signatures may be predefined based on a transmission policy, or configured by a transmission node. The set of signatures may be received via layer 1 signalling or a higher layer signalling.

Table 4 shows a plurality of UEs with sets of signatures. Different sets of signatures are allocated for different UEs, low probability of collisions may be achieved.

TABLE 4

| | TX1, RV1 | TX2, RV3 | TX3, RV2 | TX4, RV4 |
|---|---|---|---|---|
| UE1 | S0 | S9 | S7 | S4 |
| UE2 | S1 | S6 | S3 | S2 |
| UE3 | S6 | S8 | S2 | S5 |
| UE4 | S5 | S4 | S0 | S3 |
| ... | | | | |

Further, in embodiments of the present disclosure, even for one transmitter, different sets of signatures are allocated. The first signature may be selected from a first set of signatures, while the second signature may be selected from a second set of signatures. Particularly, when the second transmission is a re-transmission of the first transmission. Since the number of UEs resorting to re-transmissions is progressively smaller than that of UEs performing first transmissions, a size of the second set of signatures is smaller than a size of the first set of signatures, so as to reduce a cross-correlation metric. The probability of collisions may be further reduced.

In embodiments of the present disclosure, the transmitter may be included in a group of transmitters. The set of signatures is arranged for the group of transmitters. The method for multiple access transmission by a transmitter includes: allocating a signature from the set of signatures to a transmission of a block of data, which is different from another signature allocated from the set of signatures by another transmitter in the group of transmitters, in response to that the transmitter shares a transmission resource with the another transmitter.

Table 5 shows a plurality of UEs with the same sets of signatures. The same sets of signatures are allocated for different UEs, thus the number of signatures may be reduced. Further, the allocation manner of the signatures is particularly designed so as to ensure non-colliding signature allocation at each transmission.

TABLE 5

| | TX1, RV1 | TX2, RV3 | TX3, RV2 | TX4, RV4 |
|---|---|---|---|---|
| UE1 | S0 | S1 | S2 | S3 |
| UE2 | S1 | S0 | S3 | S2 |
| UE3 | S2 | S3 | S0 | S1 |
| UE4 | S3 | S2 | S1 | S0 |

It should be understood the TX of UE means the transmissions both from and to the UE, namely, there may be one transmitter transmitting data to the plurality of UEs in table 5 at the same time. In this embodiment, the transmitter is configured to communicate with a group of receivers. The set of signatures is arranged for the group of receivers. The method for multiple access transmission by a transmitter includes: allocating a signature from the set of signatures to a transmission of a block of data to for receiver in the group of receivers, which is different from another signature in the set of signatures allocated for another receiver in the group of receivers, in response to that the receiver shares a transmission resource with the another receiver.

For the group of the transmitters, the frequency resource may also hop. Table 6 shows a plurality of UEs with the same sets of signatures and hopping frequency. In the example of table 6 below, in 4 transmissions of the same transport block (transmission and retransmissions) UEs use different signatures as well as different frequency resources.

TABLE 6

|     | TX1, RV1 | TX2, RV3 | TX3, RV2 | TX4, RV4 |
| --- | --- | --- | --- | --- |
| UE1 | S0, f1 | S1, f2 | S2, f3 | S3, f1 |
| UE2 | S1, f1 | S0, f3 | S3, f2 | S2, f2 |
| UE3 | S2, f1 | S3, f2 | S0, f3 | S1, f3 |
| UE4 | S3, f1 | S2, f3 | S1, f2 | S0, f2 |

However, when applying different frequency, the signatures can be the same, which can be for example shown in table 7 below.

TABLE 7

|     | TX1, RV1 | TX2, RV3 | TX3, RV2 | TX4, RV4 |
| --- | --- | --- | --- | --- |
| UE1 | S0, f1 | S1, f2 | S2, f3 | S3, f1 |
| UE2 | S1, f1 | S0, f3 | S3, f2 | S2, f2 |
| UE3 | S2, f1 | S3, f2 | S0, f3 | S1, f3 |
| UE4 | S3, f1 | S2, f3 | S1, f2 | S0, f2 |

As other examples, the frequency hopping parameter can depend on the signature which is used in a transmission, e.g. signature S0 may be always with frequency f0, and so on.

In the embodiments, the signatures can be also determined by other parameters, such as the time domain value of system frame number (SFN) mod 4 (if the available signature set size is 4). S0 may correspond to SFN0, S1 may correspond to SFN1, S2 may correspond to SFN2, and S3 may correspond to SFN3.

Alternatively, the signature index for RVn for user k may be determined as S(k, n)=F (S(k, 1), n) where F is a pre-determined non-linear function of n. The function means when a signature S(k, 1) for the user k with RV1 is determined, the signature S(k, n) for the user k with RVn is determined based on function F, S(k, 1), and n.

Figure 7:
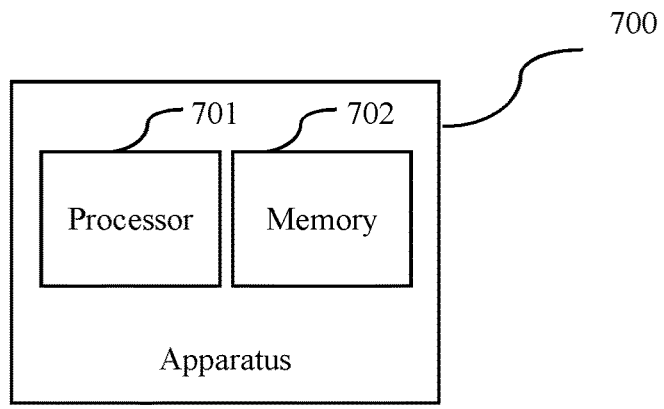
FIG. 7 is a block diagram showing an apparatus in accordance with some embodiments.

FIG. 7 is a block diagram showing an apparatus in accordance with some embodiments.

A second aspect of the present disclosure provides an apparatus for multiple access transmission. As shown in FIG. 7, the apparatus 700 include: a processor 701; and a memory 702 containing instructions executable by the processor. The apparatus 700 is operative to the method described above.

In FIG. 7, the processor 701 may be any kind of processing component, such as one or more microprocessor or microcontrollers, as well as other digital hardware, which may include digital signal processors (DSPs), special-purpose digital logic, and the like. The memory 702 may be any kind of storage component, such as read-only memory (ROM), random-access memory, cache memory, flash memory devices, optical storage devices, etc.

Figure 8:
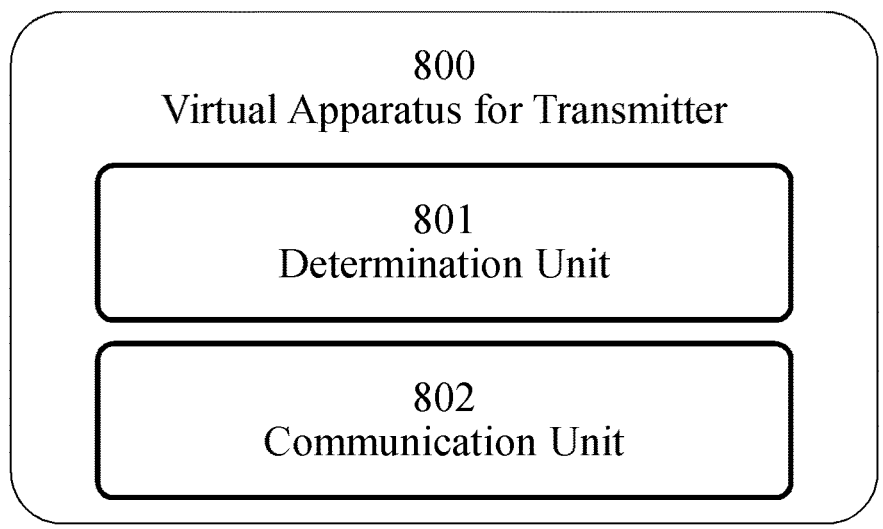
FIG. 8 is a schematic showing virtualization apparatus for the transmitter in accordance with some embodiments.

FIG. 8 is a schematic showing virtualization apparatus for the transmitter in accordance with some embodiments.

A virtual apparatus 800 may perform the methods as shown in the FIGS. 4, 5, 6. As an example shown in FIG. 8, the virtual apparatus 800 for mobile switching node includes a determination unit 801, and a communication unit 802. Taking the method in FIG. 4 as an example, determination unit 801 may perform steps S401, S402.

With virtual apparatus 800, the transmitter, such as a branch/layer of the UE, may not need fixed processor or memory, any computing resource and storage resource may be arranged. The introduction of virtualization technology may improve the usage efficiency of the transmission resources and the flexibility of the transmitter.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 9:
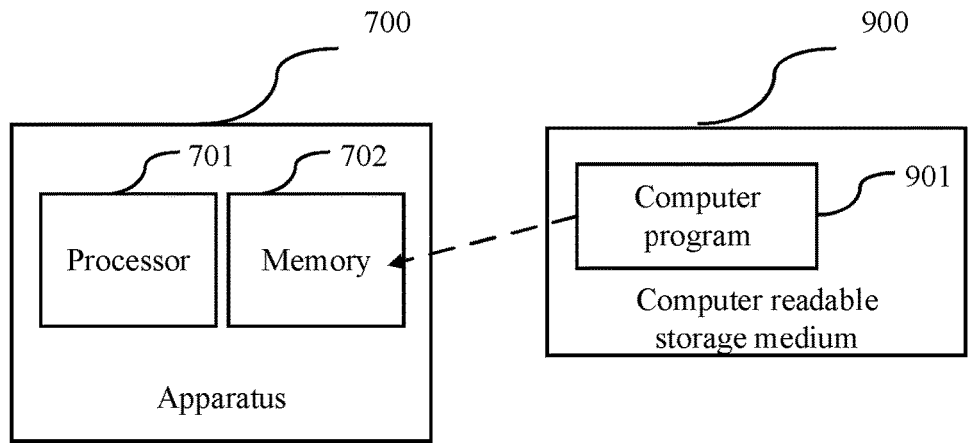
FIG. 9 is a schematic showing computer readable storage medium in accordance with some embodiments.

FIG. 9 is a schematic showing computer readable storage medium in accordance with some embodiments.

A third aspect of the present disclosure provides a computer readable storage medium. As shown in FIG. 9, the computer readable storage medium 900 has a computer program 901 stored thereon, the computer program 901 is executable by a device to cause the device to carry out the method described above.

Further, embodiments of the specific wireless device (UE), base station, and communication system are further illustrated below with FIGS. 10 to 18.

Figure 10:
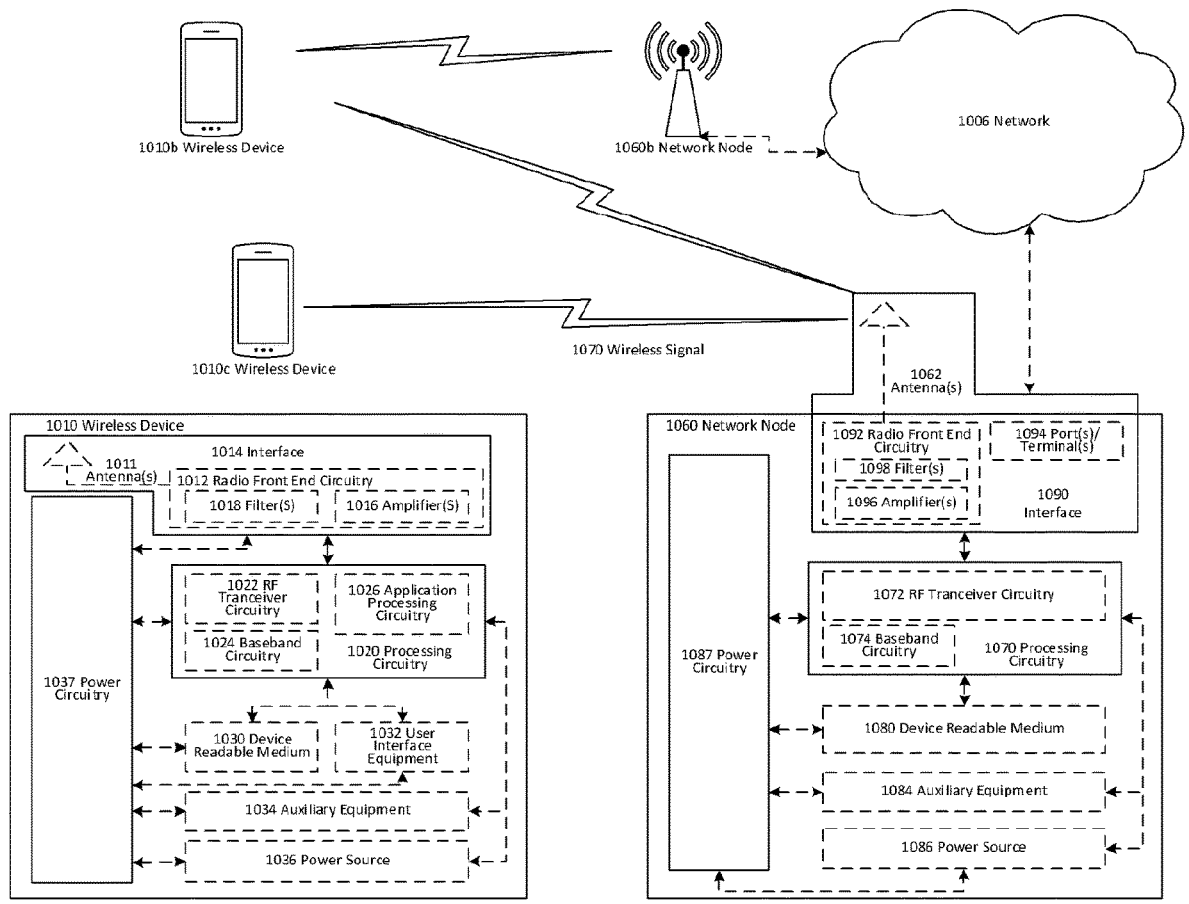
FIG. 10 is a schematic showing a wireless network in accordance with some embodiments.

FIG. 10 is a schematic showing a wireless network in accordance with some embodiments.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 1006, network nodes 1060 and 1060b, and WDs 1010, 1010b, and 1010c. In practice, a wireless network may further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features, functions, or benefits discussed herein. In some embodiments, processing circuitry 1070 may include a system on a chip (SOC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units In certain embodiments, some or all of the functionality described herein as being provided by a network node, base station, eNB or other such network device may be performed by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 1080 may be considered to be integrated.

Interface 1090 is used in the wired or wireless communication of signalling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being performed by a network node. Any information, data and/or signals may be received from a wireless device, another network node and/or any other network equipment. Similarly, antenna 1062, interface 1090, and/or processing circuitry 1070 may be configured to perform any transmitting operations described herein as being performed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 10 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as, for example, GSM, WCDMA, LTE, NR, WiFi, WiMAX, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 1020 may be configured to perform any receiving or transmitting operations described herein as being performed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1018 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being performed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being performed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 1036 to make the power suitable for the respective components of WD 1010 to which power is supplied.

Figure 11:
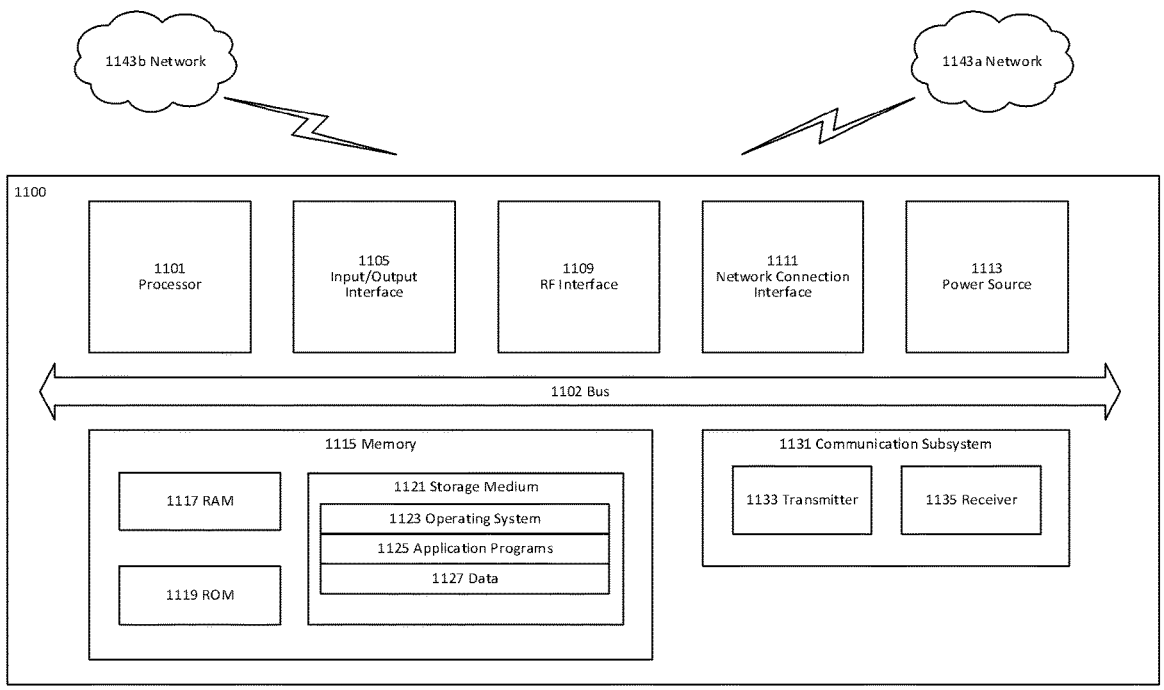
FIG. 11 is a schematic showing a user equipment in accordance with some embodiments.

FIG. 11 is a schematic showing a user equipment in accordance with some embodiments.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1100 may be any UE identified by the $3^{rd}$ Generation Partnership Project (3GPP), including a NB-IoT UE, a machine type communication (MTC) UE, and/or an enhanced MTC (eMTC) UE. UE 1100, as illustrated in FIG. 11, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 1109 may be configured to provide a communication interface to RF components such as a transmitter, a receiver, and an antenna. Network connection interface 1111 may be configured to provide a communication interface to network 1143a. Network 1143a may encompass wired and/or wireless networks such as a local-area network (LAN), a wide-area network (WAN), a computer network, a wireless network, a telecommunications network, another like network or any combination thereof. For example, network 1143a may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1119 may be configured to provide computer instructions or data to processing circuitry 1101. For example, ROM 1119 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 11, processing circuitry 1101 may be configured to communicate with network 1143b using communication subsystem 1131. Network 1143a and network 1143b may be the same network or networks or different network or networks. Communication subsystem 1131 may be configured to include one or more transceivers used to communicate with network 1143b. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143b may encompass wired and/or wireless networks such as a local-area network (LAN), a wide-area network (WAN), a computer network, a wireless network, a telecommunications network, another like network or any combination thereof. For example, network 1143b may be a cellular network, a Wi-Fi network, and/or a near-field network. Power source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 12:
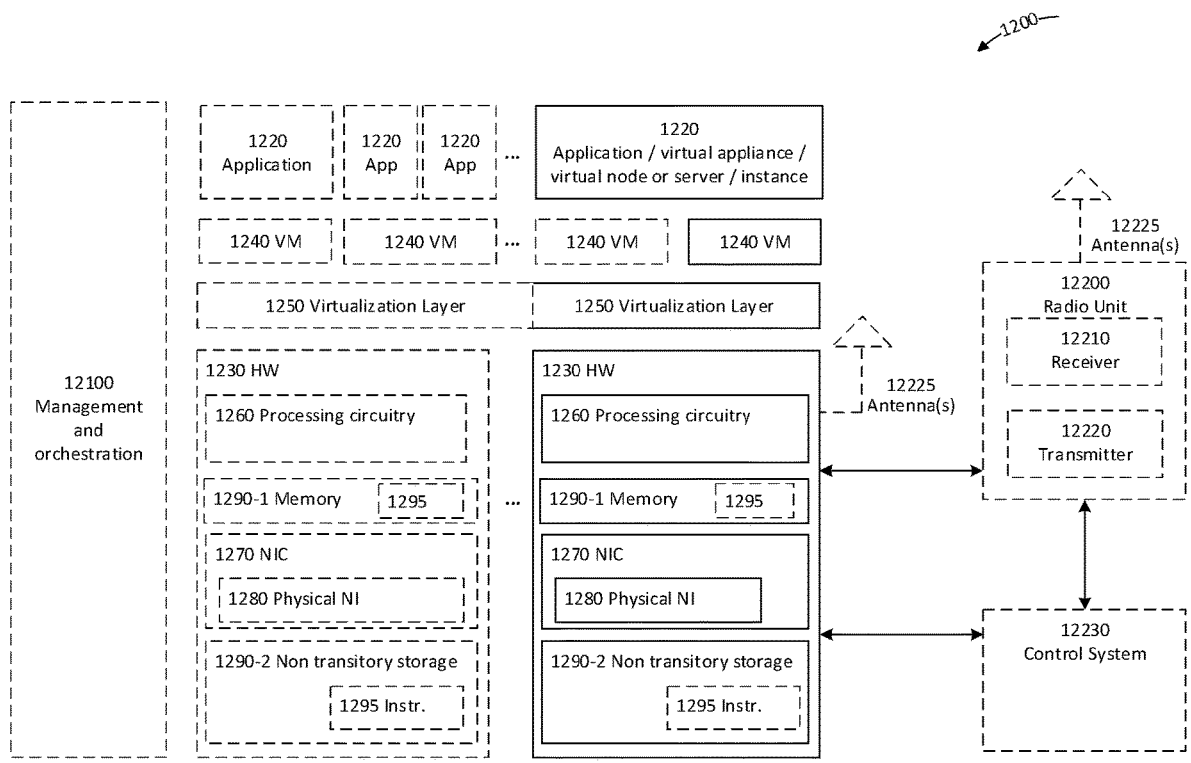
FIG. 12 is a schematic showing a virtualization environment in accordance with some embodiments.

FIG. 12 is a schematic showing a virtualization environment in accordance with some embodiments.

FIG. 12 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 12, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 12.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signalling can be effected with the use of control system 12230 which may alternatively be used for communication between the hardware nodes 1230 and radio units 12200.

Figure 13:
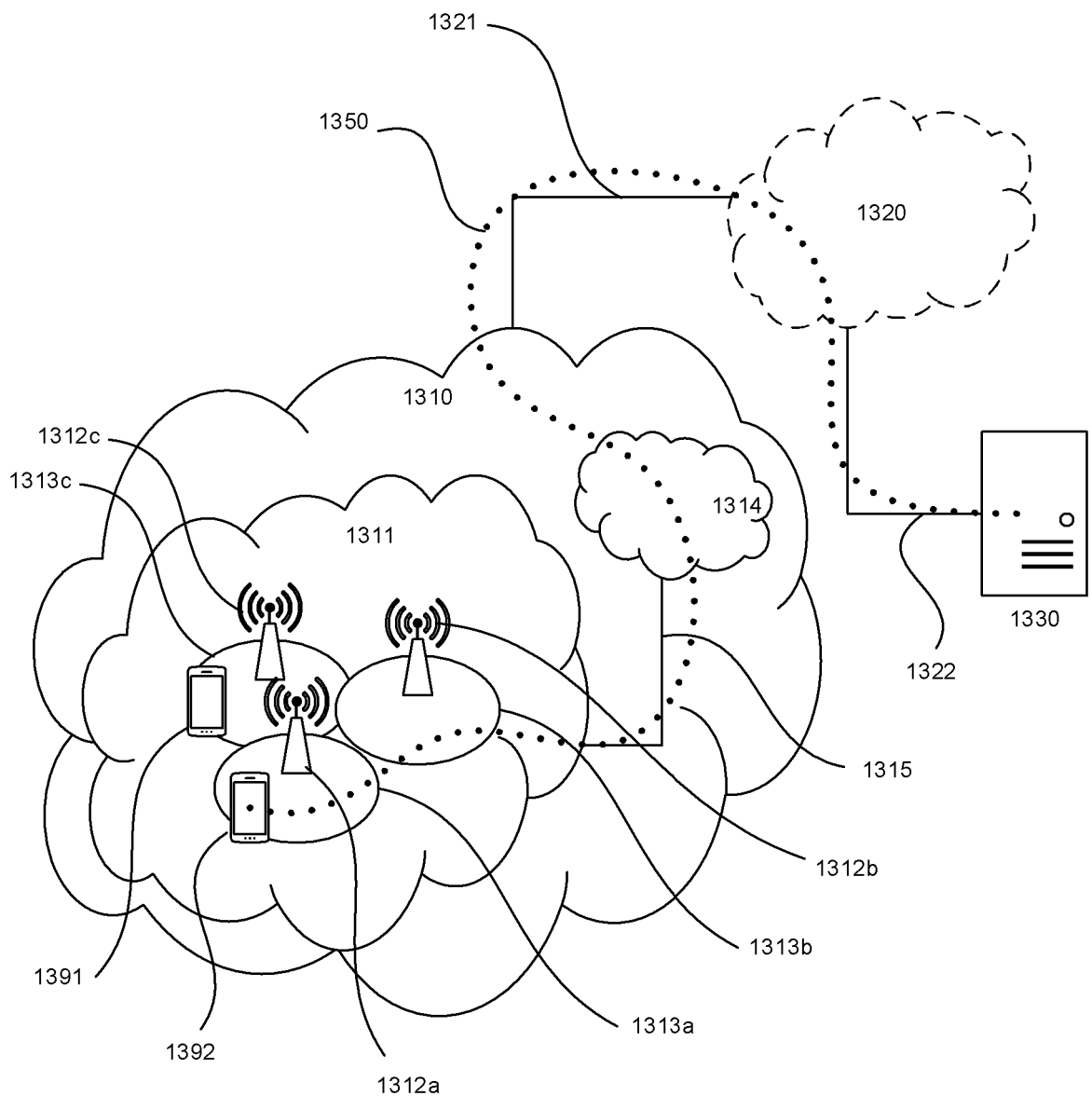
FIG. 13 is a schematic showing a telecommunication network connected via an intermediate network to a host computer in accordance with some embodiments.

FIG. 13 is a schematic showing a telecommunication network connected via an intermediate network to a host computer in accordance with some embodiments.

With reference to FIG. 13, in accordance with an embodiment, a communication system includes telecommunication network 1310, such as a 3GPP-type cellular network, which comprises access network 1311, such as a radio access network, and core network 1314. Access network 1311 comprises a plurality of base stations 1312*a*, 1312*b*, 1312*c*, such as NBs, eNBs, gNBs or other types of wireless access points, each defining a corresponding coverage area 1313*a*, 1313*b*, 1313*c*. Each base station 1312*a*, 1312*b*, 1312*c* is connectable to core network 1314 over a wired or wireless connection 1315. A first UE 1391 located in coverage area 1313*c* is configured to wirelessly connect to, or be paged by, the corresponding base station 1312*c*. A second UE 1392 in coverage area 1313*a* is wirelessly connectable to the corresponding base station 1312*a*. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 13 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Figure 14:
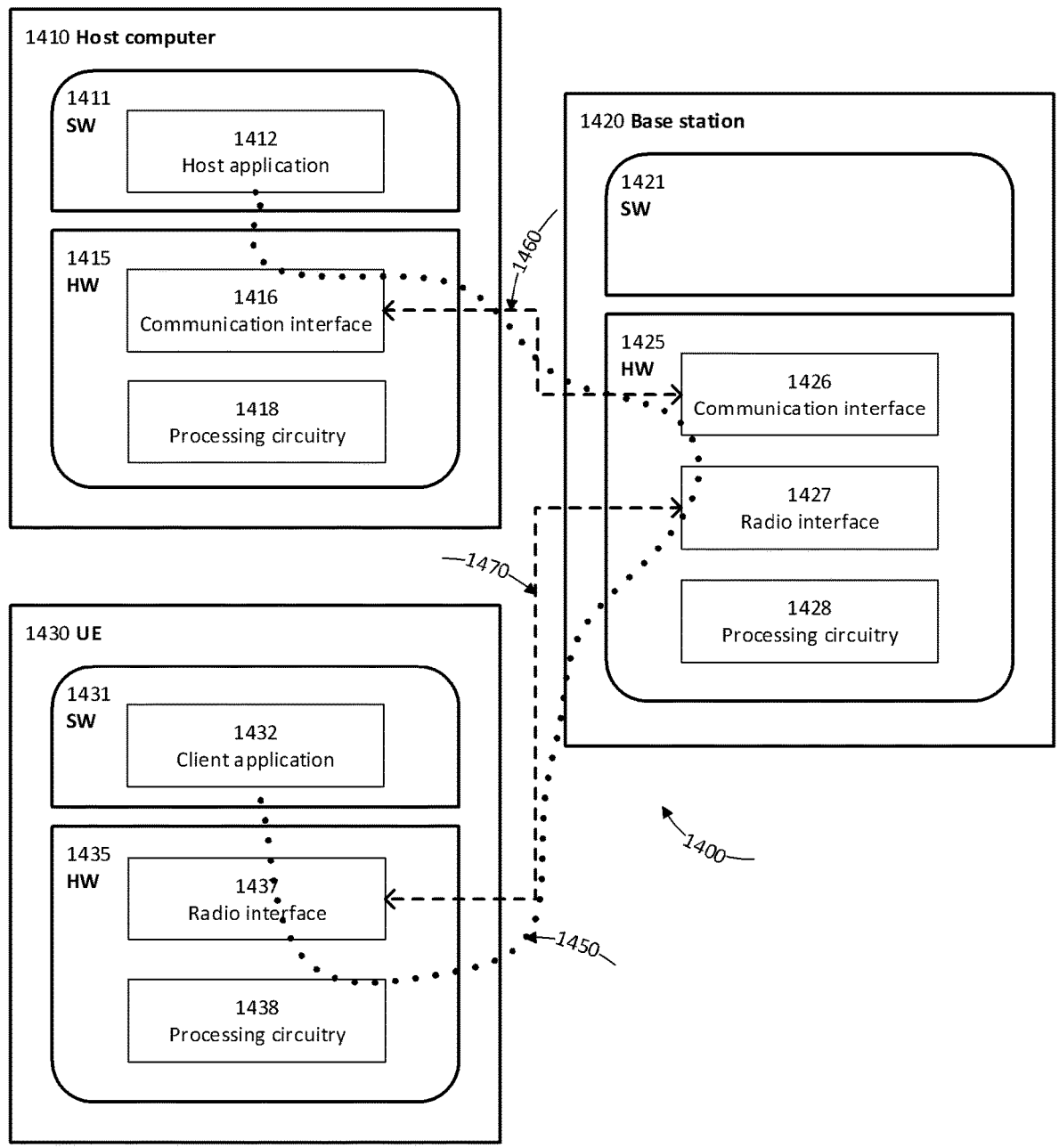
FIG. 14 is a schematic showing a host computer communicating via a base station with a user equipment over a partially wireless connection in accordance with some embodiments.

FIG. 14 is a schematic showing a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 14. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 14) served by base station 1420. Communication interface 1426 may be configured to facilitate connection 1460 to host computer 1410. Connection 1460 may be direct or it may pass through a core network (not shown in FIG. 14) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

It is noted that host computer 1410, base station 1420 and UE 1430 illustrated in FIG. 14 may be similar or identical to host computer 1330, one of base stations 1312a, 1312b, 1312c and one of UEs 1391, 1392 of FIG. 13, respectively. This is to say, the inner workings of these entities may be as shown in FIG. 14 and independently, the surrounding network topology may be that of FIG. 13.

In FIG. 14, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve the latency, and power consumption for a reactivation of the network connection, and thereby provide benefits, such as reduced user waiting time, enhanced rate control.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signaling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 15:
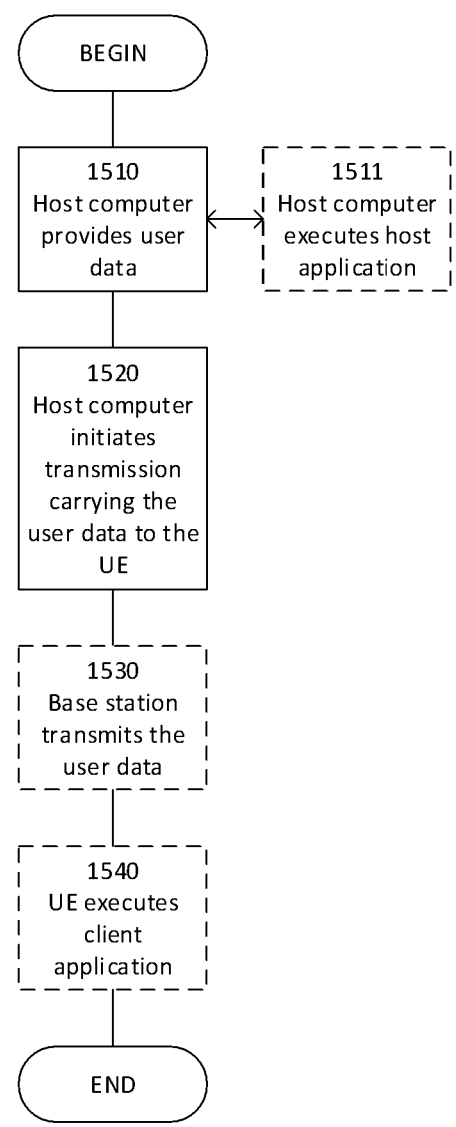
FIG. 15 is a schematic showing methods implemented in a communication system including a host computer, a base station and a user equipment in accordance with some embodiments.

FIG. 15 is a schematic showing methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 16:
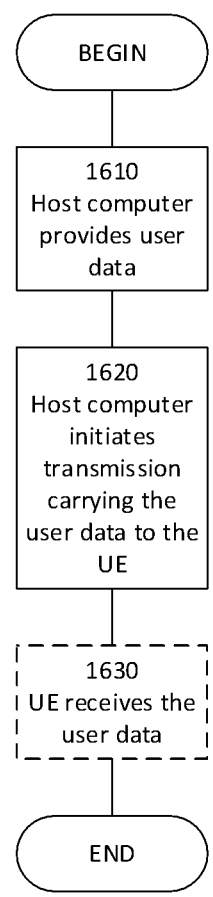
FIG. 16 is a schematic showing methods implemented in a communication system including a host computer, a base station and a user equipment in accordance with some embodiments.

FIG. 16 is a schematic showing methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 17:
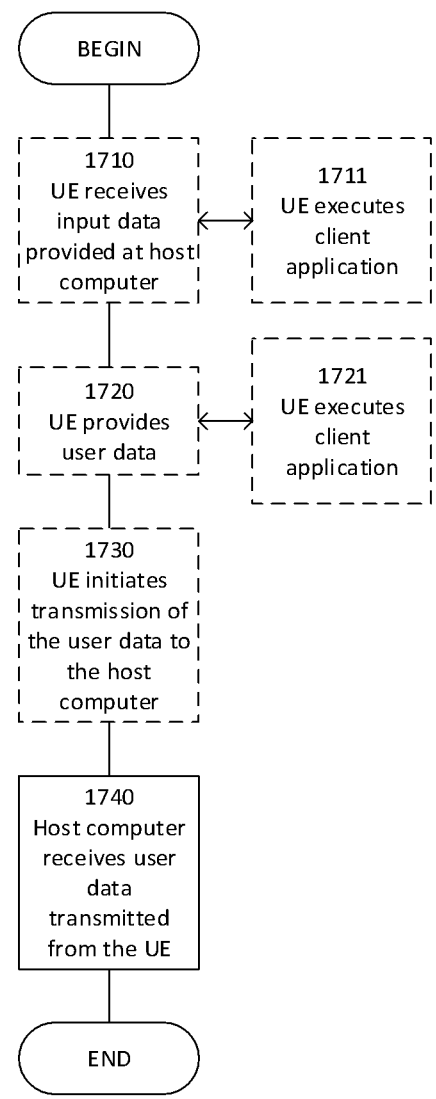
FIG. 17 is a schematic showing methods implemented in a communication system including a host computer, a base station and a user equipment in accordance with some embodiments.

FIG. 17 is a schematic showing methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

Figure 18:
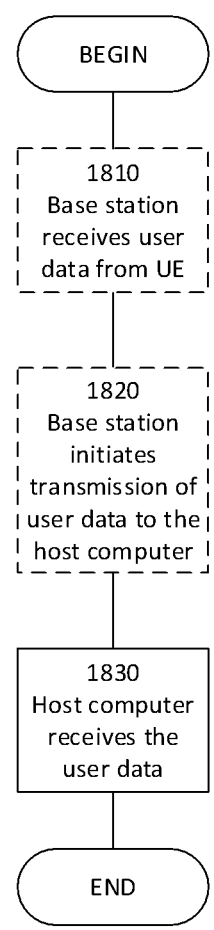
FIG. 18 is a schematic showing methods implemented in a communication system including a host computer, a base station and a user equipment in accordance with some embodiments.

FIG. 18 is a schematic showing methods implemented in a communication system including a host computer, a base station and a user equipment in accordance with some embodiments.

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

Due to embodiments in the present disclosure, with hopping of the signature, the diversity gain for the transmission is improved. The successful rate of NOMA transmission in the communication system will be improved. More users may be served by the network at the same time. Further, the latency, power consumption may be improved, since time and radio resources for transmission are better utilized.

In general, the various exemplary embodiments of the present disclosure may be implemented in hardware or special purpose circuits, software, logic or any combination thereof. For example, some aspects may be implemented in hardware, while other aspects may be implemented in firmware or software that may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may include circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by those skilled in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

The invention claimed is:

1. A method for multiple access transmission by a transmitter, comprising:
   determining a first signature allocated to a first transmission of a block of data;
   determining a second signature allocated to a second transmission of the block of data;
   determining a first redundancy version of an incremental redundancy allocated to the first transmission; and
   determining a second redundancy version of an incremental redundancy allocated to the second transmission, wherein:
   the first signature is selected from a first set of signatures,
   the second signature is selected from a second set of signatures, and
   the first set of signatures and the second set of signatures are predefined based on a transmission policy or are configured by a transmission node.

2. The method according to claim 1, wherein the first signature and the second signature are selected randomly.

3. The method according to claim 2, wherein the transmission node is a node on network side of a communication system.

4. The method according to claim 2, wherein the first set of signatures and the second set of signatures are received via layer 1 signalling or a higher layer signalling.

5. The method according to claim 1, wherein the first set of signatures and the second set of signatures are the same.

6. The method according to claim 2, wherein:
the second transmission is a re-transmission of the first transmission, and
a size of the second set of signatures is smaller than a size of the first set of signatures.

7. The method according to claim 1, wherein:
the first transmission is an initial transmission and the second transmission is another initial transmission; or
the first transmission is a re-transmission of an initial transmission and the second transmission is another re-transmission of the initial transmission.

8. The method according to claim 1, further comprising:
determining a first frequency resource allocated to the first transmission; and
determining a second frequency resource allocated to the second transmission.

9. The method according to claim 1, wherein at least one of the first signature and the second signature is determined based on a transmission policy or configured by a transmission node.

10. The method according to claim 1, wherein:
the at least one of the first signature and the second signature is determined based on a transmission parameter; and
the transmission parameter comprises at least one of: a frequency, a redundancy version, and a system frame number.

11. The method according to claim 10, wherein a relationship between the at least one of the first signature and the second signature, and the transmission parameter is predefined based on a transmission policy or configured by a transmission node.

12. The method according to claim 1, wherein the at least one of the first signature and the second signature comprises at least one of: an encoding parameter, a modulating parameter, a spreading parameter, a resource mapping parameter, a power allocation parameter, a resource mapping pattern, and an orthogonal cover code.

13. The method according to claim 1, wherein the transmitter is one of: a user equipment, a transmission branch of a user equipment, or a base station.

14. The method according to claim 1, wherein the at least one of the first signature and the second signature is allocated to a block of data to be transmitted during one of: an uplink transmission, a downlink transmission, and a sidelink transmission.

15. An apparatus for multiple access transmission, comprising:
a processor; and
a memory having instructions executable by the processor stored therein, wherein execution of the instructions configures the apparatus to:
determine a first signature allocated to a first transmission of a block of data;
determine a second signature allocated to a second transmission of the block of data;
determine a first redundancy version of an incremental redundancy allocated to the first transmission; and
determine a second redundancy version of an incremental redundancy allocated to the second transmission, wherein:
the first signature is selected from a first set of signatures,
the second signature is selected from a second set of signatures, and
the first set of signatures and the second set of signatures are predefined based on a transmission policy or are configured by a transmission node.

16. The apparatus according to claim 15, wherein the first signature and the second signature are selected randomly.

17. The apparatus according to claim 16, wherein:
the second transmission is a re-transmission of the first transmission, and
a size of the second set of signatures is smaller than a size of the first set of signatures.

18. The apparatus according to claim 15, wherein:
the first transmission is an initial transmission and the second transmission is another initial transmission; or
the first transmission is a re-transmission of an initial transmission and the second transmission is another re-transmission of the initial transmission.

* * * * *